June 17, 1930.  E. J. VON PEIN  1,763,915
CASH REGISTER
Filed Feb. 10, 1926     5 Sheets-Sheet 1

Inventor
Edward J. Von Pein
By
His Attorneys

June 17, 1930.  E. J. VON PEIN  1,763,915
CASH REGISTER
Filed Feb. 10, 1926   5 Sheets-Sheet 2

Inventor
Edward J. Von Pein
By Pearl Beust
Henry E. Stauffer
His Attorneys

Inventor
Edward J. Von Pein
His Attorneys

June 17, 1930.  E. J. VON PEIN  1,763,915

CASH REGISTER

Filed Feb. 10, 1926  5 Sheets-Sheet 4

Inventor
Edward J. Von Pein
By
His Attorneys

June 17, 1930.    E. J. VON PEIN    1,763,915
CASH REGISTER
Filed Feb. 10, 1926    5 Sheets-Sheet 5

Inventor
Edward J. Von Pein
By Carl Beust
Henry E Stauffer
His Attorneys

Patented June 17, 1930

1,763,915

UNITED STATES PATENT OFFICE

EDWARD J. VON PEIN, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed February 10, 1926. Serial No. 87,348.

This invention relates particularly to a total-printing mechanism adapted to a machine of the general type disclosed in the patent to Thomas Carney, No. 497,860, dated May 23, 1893.

One object of this invention is to provide a machine of the type disclosed in the above mentioned patent with a simple and effective total-printing mechanism whereby a total of the amount on the totalizer may be printed at any time desired.

Another object is to provide an interlocking mechanism between the total resetting mechanism, total impression mechanism and the main operating mechanism, to compel resetting of the totalizer after the total has been printed before the machine can be operated to enter another item.

An additional object is to provide an interlocking device between the machine cabinet lid or closure, which normally conceals the totalizer and total printing mechanism, and the main operating mechanism, which interlock compels the lid to be closed before the main operating mechanism can be operated.

A further object is to provide an interlocking device between the machine cabinet lid and the totalizer wheels, and the totalizer resetting or turn-to-zero mechanism, to compel the lid to be closed before the resetting mechanism can be operated.

Another object is to provide the machine with a counting device operated to count one, directly by the movement of the turn-to-zero key.

An additional object of this invention is to provide an impression means for cooperation with the totalizer and the counting mechanism with the parts so arranged that the total on the totalizer, and the amount on the counting mechanism are printed simultaneously on an inserted card or slip.

Another object is to provide special means for preventing "overthrow" of the totalizer when the same is being reset.

With these and incidental objects in view, the invention includes certain novel features of construction and combinations of parts, the essential elements of which are set forth in appended claims and a preferred form or embodiment of which is hereinafter described with reference to the drawings which accompany and form part of this specification.

General description

The machine disclosed is what is known in the art as a key-operated cash register.

It has three groups of amount keys, a totalizer for accumulating all amounts entered by said keys, and a counting device which counts "one" each time the totalizer is turned to zero.

The actuating mechanism for the totalizer is operated directly by depression of the amount keys, and is substantially the same mechanism as that disclosed in the above-mentioned Carney patent.

The item indicating mechanism is only generally shown, but it, also, is substantially the same as that disclosed in said Carney patent.

Associated with each totalizer wheel and counting wheel and rigid therewith, is a type wheel for recording the total and the number of times the totalizer has been turned to zero.

Cooperating with the totalizer and the counting device type wheels is a manually operated impression device whereby a printed record of the totalizer and reset counter may be made at any desired time.

Figure 4:
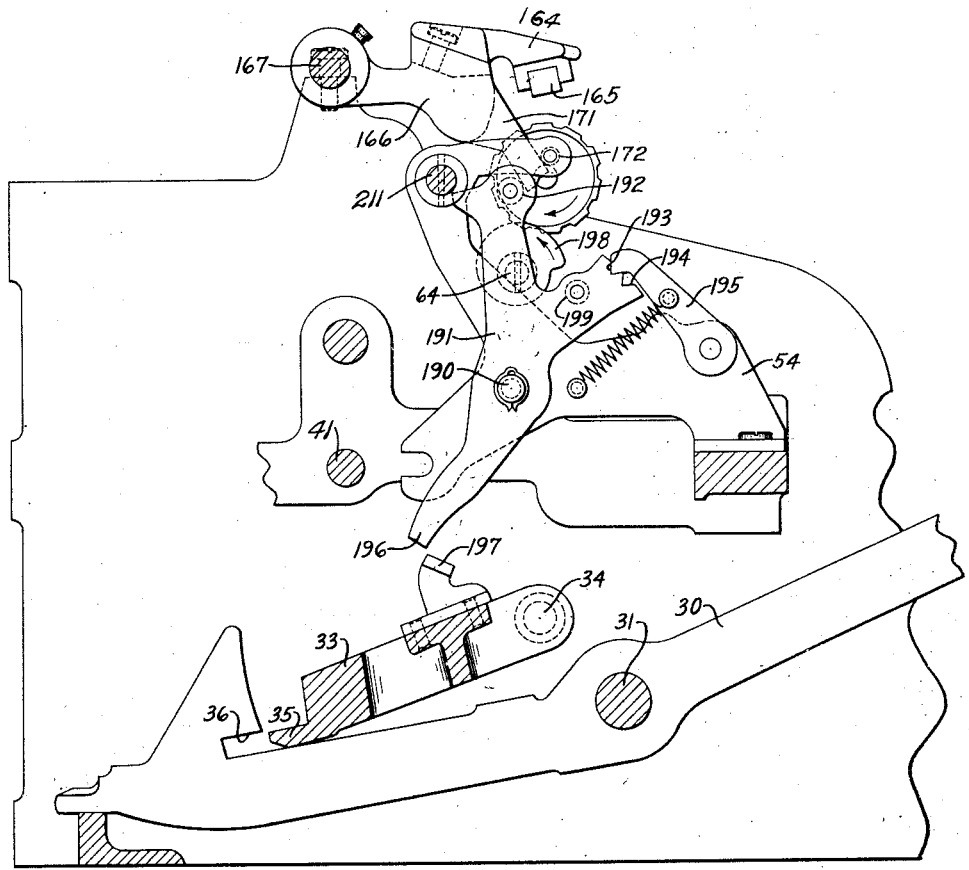
Fig. 4 shows the interlocking mechanism between the main operating mechanism, the totalizer resetting mechanism and the impression mechanism, to compel the totalizer to be reset after the total has been printed before the main operating mechanism can be operated.

*Keyboard.*—The keyboard (Fig. 1) includes three groups of amount key levers 30 pivoted on a shaft 31 (Figs. 2 and 4) carried by side frames 32.

Figure 6:
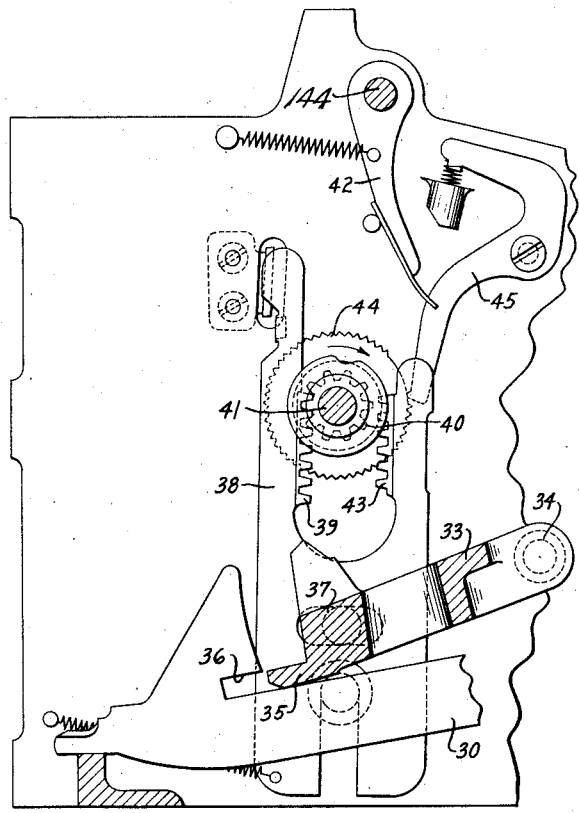
Fig. 6 shows the main operating shaft of the machine and its driving mechanism.

*Main operating mechanism.*—Cooperating with the keys 30 of all groups is, what is known in the art, as a key coupler 33 pivoted at 34. When the outer ends of the keys are depressed, a lip 35 (Figs. 2, 4 and 6) of the key coupler enters slots 36 in the keys, and in this way couples together the operated keys of the several groups, so that after they have been started, the depression of any one completes the operation of all. After the keys have been fully depressed and the operator releases the same, they are returned to their home positions by the key coupler.

The key coupler 33 carries a stud 37 entering a slot in a double rack 38. Upon clockwise movement of the key coupler 33 (Fig. 6), the rack is raised and its teeth 39 rotate a pinion 40 fast on a shaft 41 a half turn. Rack 38 then strikes a spring actuated pawl 42, which disengages the teeth 39 from the gear 40 and engages the teeth 43 thereof with the gear. The rack 38 is then moved downwardly by the key coupler and turns the shaft 41 the other half of its rotation.

Secured to the shaft 41 is a ratchet 44 which cooperates with a spring pressed pawl 45. Said ratchet and pawl constitute a full stroke device for the main operating mechanism.

Figure 9:
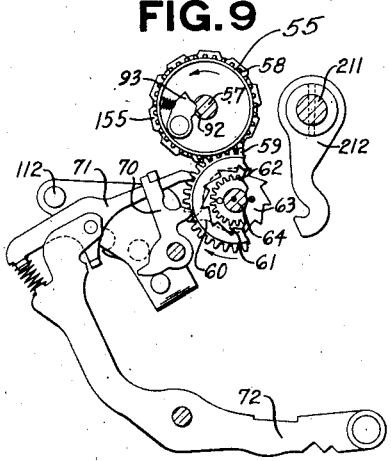
Fig. 9 shows the totalizer resetting pawl, part of the totalizer transfer mechanism, and the interlock between the machine cabinet lid and the totalizer.

*Totalizer.*—The totalizer includes three reading or indicating wheels 55 (Figs. 1, 3, and 9) directly actuated by the amount keys, and four overflow wheels 56. These wheels are all mounted on a shaft 57 carried by a totalizer frame 52.

Secured to each of the wheels 55 and the first overflow wheel 56 is a gear 58 which meshes with a gear 59. Fast to the gear 59 is a transfer or carry tooth 60, a ratchet 61, a pinion 62, and a reverse ratchet 63. These are all mounted on a shaft 64 supported by the frame 52.

Whenever the units wheel 55 passes through "zero," the carry tooth 60 strikes a trip pawl 70, disengaging it from a transfer pawl 71 which cooperates with the ratchet 61 of the tens order. This construction is the same between the tens and hundreds and between the hundreds and thousands orders. The pawls 71 are operated by a lever 72 from cams (not shown) on the shaft 41. At each operation of the machine, and whenever the trip pawl 70 is disengaged from the transfer pawl 71, the movement of the lever 72 causes the released transfer pawl 71 to operate its respective ratchet 61 to add "one" to the totalizer wheel associated with that order.

The transfer mechanism for the three higher order totalizer wheels 56 is designated generally by the number 73 (Fig. 3) and is the type known as the Geneva transfer. As this is old and well known in the art, it is not thought necessary to describe it here. A retaining pawl 76 (Fig. 2) cooperates with each of the ratchets 61 to prevent retrograde movement thereof.

The pinions 62 are normally disengaged from the totalizer actuators. Upon depression of an amount key 30, a cam 77 (Fig. 2) on the rotation shaft 41 rocks a lever 78 pivoted at 79 on the totalizer frame 52. This lever 78 through its contact with a stud 80 on the totalizer frame 52 rocks the frame clockwise and engages the pinions 62 with the totalizer actuators to be hereinafter described.

Figure 15:
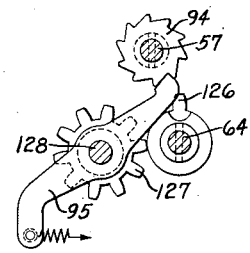
Fig. 15 shows the reset counter actuator and the device for preventing retrograde movement of the totalizer resetting key.

*Turn-to-zero mechanism.*—The totalizer wheels 55 and 56 are turned to zero by a key 90 (Fig. 3), inserted through the cabinet to engage the slot of a slotted hub 91 loose on the totalizer shaft 57, said hub 91 having a driving connection with the shaft 57. The key is turned so as to rotate the shaft 57 counter-clockwise (Figs. 9 and 11) and a notch 92 in the shaft 57 picks up the turn-to-zero or reset pawls 93 carried by the totalizer wheels 55 and 56 and rotates the wheels in the direction of their adding movements, until they reach zero. To prevent the key 90 from being turned backwardly, after the totalizer wheels have been started to be turned to zero, there is fast on the shaft 57 a ratchet 94 (Fig. 15) engaged by a spring-pressed retaining pawl 95.

Figure 8:
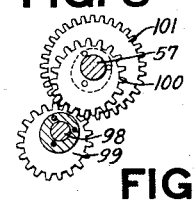
Fig. 8 is a detail of the elliptical gears used for preventing overthrow of the totalizer when the same is being reset.

The driving connection between the hub 91 and shaft 57 includes a safety device comprising a pair of elliptical gears (Figs. 3, 8 and 11) designed to prevent the totalizer wheels from being "overthrown" during resetting. These gears are arranged so as to cause the shaft 57 to turn just half as fast as the key 90 is being turned at the beginning and end of movement of the key. The drive from the key 90 to the shaft 57 is through the slotted hub 91 secured to a gear 96 which meshes with a gear 97 loose on a stud 98 on the totalizer frame. Secured to the gear 97 is an elliptical gear 99 (Fig. 8) meshing with an elliptical gear 100 fast to a gear 101 which gear 101 is secured to the shaft 57. As the key turns the gear 96 counter-clockwise (Fig. 11) a complete rotation, it drives the gear 97, and its elliptical gear 99 in turn drives the elliptical gear 100, consequently driving the gear 101 and turning the shaft 57 one complete counter-clockwise rotation to turn the totalizer wheels to zero.

Figure 14:
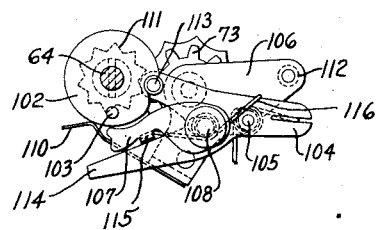
Fig. 14 shows part of the totalizer resetting mechanism.

To bring the totalizer turn-to-zero or reset shaft 57 to a positive stop at zero, the shaft 64 has secured thereto a disk 102 (Figs. 3 and 14) carrying a stop pin 103. This disk also cooperates with a lever 104 having a pin-and-slot connection 105 with a frame 106 which carries the Geneva transfer wheels 73. The lever 104 also cooperates with a stop pawl 107, slidably and pivotally mounted upon a stud 108, which, is also the pivot point for the lever 104. As the shaft 57 is given a complete turn the gear 101 thereon, turns a gear 109 fast on the shaft 64, (Fig. 11), consequently turning said shaft likewise. As the shaft 64 starts its rotation, the disk 102 through its contact with a roller 113 on the lever 104 rocks the lever 104 clockwise and moves the Geneva transfer mechanism 73 to an ineffective position. At the same time spring aliner pawls 110 are moved into engagement with alining star wheels 111 associated with the three totalizer wheels 56 of higher order. A rod 112 is moved down by the frame 106 (Figs. 1, 3, 9 and 14) so that it engages the transfer pawls 71, thus preventing them from dropping into effective positions during the time the totalizer is being reset. The clockwise rocking of the lever 104, by the contact of finger 114 thereof with a lug 115 of the stop pawl 107, moves the free end of said pawl into the path of movement of the stop pin 103 on the disk 102. A spring 116 maintains, at all times, the contact between the lever finger 114 and the lug 115. Near the end of the rotation of the shaft 64, the pin 103 engages the end of the stop pawl 107, thus bringing the disk 102 and shaft 64 to a positive stop at the time the totalizer wheels 55 and 56 reach the zero positions.

Figure 10:
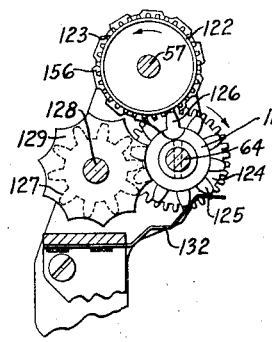
Fig. 10 shows the resetting or turn-to-zero counter actuator.
Figure 11:
Fig. 11 shows the turn-to-zero counter actuator driver.

*Reset or turn-to-zero counter.*—Carried on the shaft 57 is a reset or turn-to-zero counter having three wheels 122 (Figs. 1, 3 and 10), loose on said shaft, each wheel having attached thereto a gear 123 meshing with a gear 124. Rigid with each of the gears 124 is a gear 125. These gears 124 and 125 are loose on the shaft 64. As above stated, the gear 101 is given a complete rotation each time the key 90 is turned completely around to turn the totalizer to zero. This, as above explained, also turns the gear 109 and the shaft 64 a complete rotation in clockwise direction (Figs. 10 and 11). When this occurs, a disk 121 fast on the shaft 64, and having a single tooth 126, is given a complete clockwise rotation, and this tooth 126 engages a gear 127 loose on a shaft 128. The gear 127 has a locking wheel 129 cooperating with the toothed disk 121, so that for every rotation of the disk and tooth 126, the gear 127 is turned one tooth. This gear 127 in turn meshes with the gear 125, associated with the units order wheel 122 above described, and consequently the gear 125 is turned one step which through the gears 124 and 123, turns the units order counter wheel 122 one step, to count "one," for every complete turn of the turn-to-zero key 90 and the shaft 57. The transfer mechanism between the units and tens, and tens and hundreds orders is of the old and well-known Geneva type, and it is not thought necessary to give any detailed description thereof in this case.

The gears 125 are alined by a flat spring 132 (Fig. 10) which rides over the teeth as the gears turn.

*Totalizer actuation.*—The means for actuating the three lower-order elements of the totalizer by the keys comprises mechanism which is substantially the same as that described in the above-mentioned Carney Patent No. 497,860, and therefore will be but briefly described here.

Pivoted to each key 30 (Fig. 2) is an actuator controller 137 having a shoulder 138 adapted to engage a rod 139 supported by an actuating frame 140 which carries an adding rack 141. Depression of a key 30 raises the actuator controller 137, and the shoulder 138, through its engagement with the rod 139, rocks the adding rack 141 counter-clockwise and turns the pinion 62 clockwise a distance commensurate with the value of the key depressed. It is to be understood that the shoulders 138 for the actuator controllers 137 are located at various heights, and therefore, the actuating frame 140 is given a differential movement according to the value of the key depressed. There is, of course, an actuating frame 140 for the group of units keys 30, one for the group of dimes keys and one for the group of dollars keys.

The connection between the tens actuating frame 140 and the tens adding rack 141 is effected through the shaft 136 upon which, is secured both the tens actuating frame and the tens adding rack. The connection between the hundreds or dollars actuating frame 140 and the dollars adding rack 141 is effected through a segment 142 (Fig. 1) on said frame, which meshes with a gear 143 fast on a shaft 144. This shaft also has secured thereto another gear 145 which drives the dollars adding rack 141.

Figure 2:
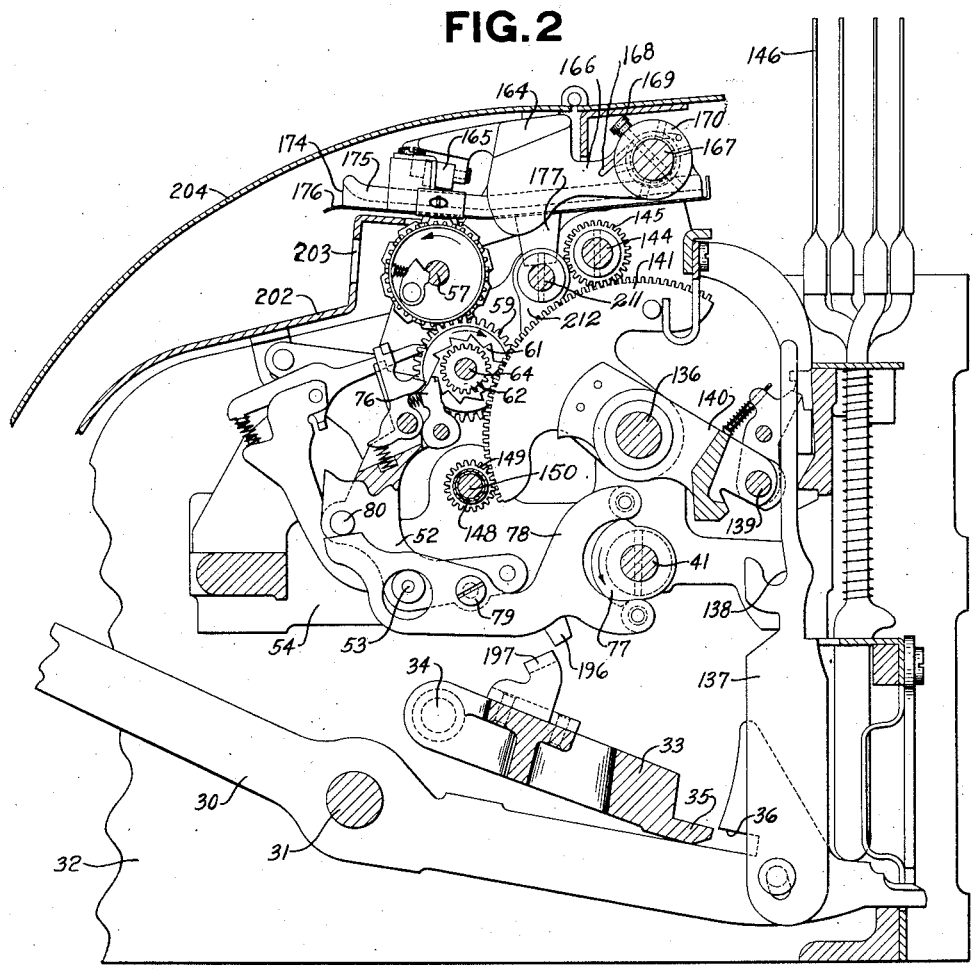
Fig. 2 shows the totalizer actuating mechanism, item indicators, and part of the total printing mechanism.

*Indicators.*—Fig. 2 discloses the tablet indicators 146, one of which rests against each of the key levers 30, and when the key is depressed to enter an amount into the totalizer, the corresponding indicator is raised and exposes to view the amount commensurate with the value of that key.

*Item printing.*—The items are printed as they are entered into the machine, from three item printing wheels 147 (Fig. 1), one is mounted on a rod 150, and each of the other two are mounted on concentric sleeves 148 carrying gears 149 (Fig. 2), meshing with the adding racks 141. Therefore, when the adding racks 141 are moved distances commensurate with the values of the keys depressed, they will, through the gears 149, rod 150 and sleeves 148, turn the type wheels 147 like extents, so that they are set according to the value of the item entered into the machine.

There is no printing platen nor detail paper mechanism shown in conjunction with these item wheels 147, as the one used is substantially the same as that shown in the patent to Carney, No. 497,860, dated May 23, 1893.

Figure 1:
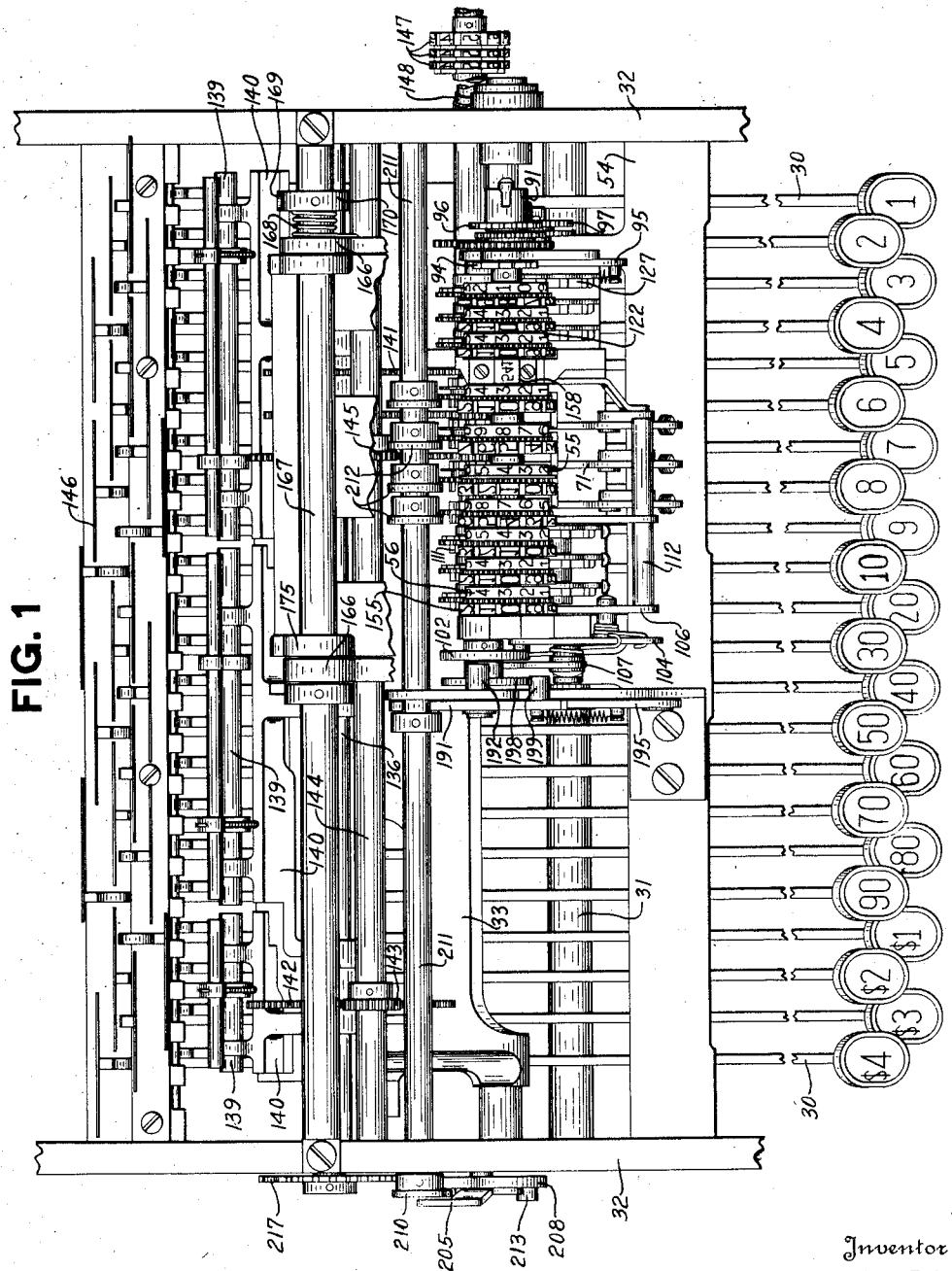
Fig. 1 is a plan view of the machine, the impression device and record material support being broken away to more clearly show the totalizer and the turn-to-zero counter.
Figure 3:
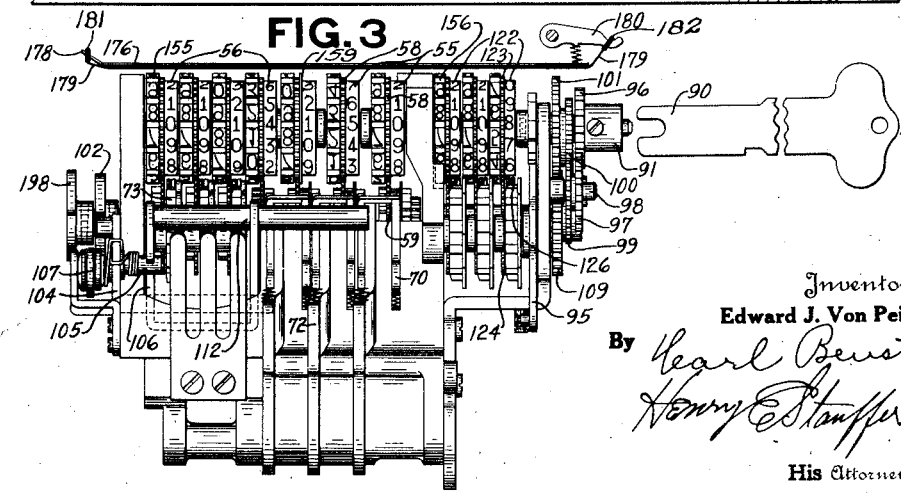
Fig. 3 is a front elevation of the totalizer, the turn-to-zero counter and their associated recording devices.
Figure 13:
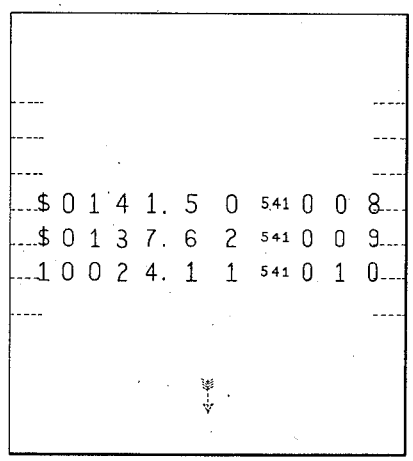
Fig. 13 shows the reverse side of the slip of Fig. 12 with three totals and other information printed thereon.

*Total-printing type wheels and resetting-counter type wheels.*—Rigid with each of the totalizer wheels 55 and 56 is a type wheel 155 (Figs. 1, 2, 3, and 9). Rigid with each of the turn-to-zero counter wheels 122 is a type wheel 156 (Figs. 1, 3 and 10). As the type wheels 155 are rigid with the totalizer wheels 55 and 56, the amounts disclosed by the reading wheels are set in printing position on the type wheels 155. The number disclosed upon the reset or turn-to-zero counter wheels 122 is also set upon the type wheels 156. A disk 159, secured to the dollars totalizer wheel 55, is provided with a projection opposite each type character engraved on the dollars type wheel 155, to print a decimal point, as shown in Fig. 13. Any time the proprietor wishes to know how much money he has taken in, he inserts a slip into the machine and prints the total from the type wheels 155. At the same time he will get a record from the type wheels 156, which tells him how many times the totalizer has been turned to zero. Furthermore, there is fastened on the totalizer frame 52, between the totalizer and the counter, a special number type plate 158 which may be used to designate the number of the machine from which the total is printed. In the present disclosure, "No. 541" has been shown by way of illustration.

Figure 5:
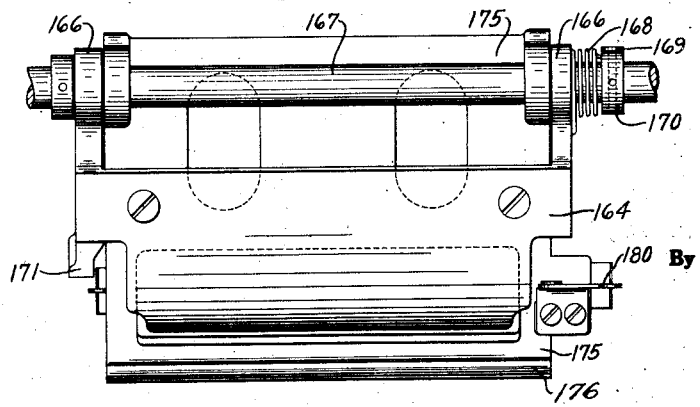
Fig. 5 is a plan view of the impression device.

*Impression device.*—The impression device consists of a platen 165 (Figs. 2 and 4) carried in a frame 164 having two arms 166 pivoted on a shaft 167. A torsion spring 168 (Fig. 1) is connected to one arm 166 and to a collar 170 pinned to the shaft 167 by a pin 169. This collar has a series of holes so that the tension of the spring 168 may be increased or diminished, as the occasion requires, by turning the collar and pinning it in a different angular position. The impression frame 164 (Fig. 4) is limited in its upward movement, however, by an arm 171 thereof engaging a pin 172 mounted on a part of the stationary frame 54. The platen 165 is of sufficient length to overlie the type wheels 155 and 156 associated with both the totalizer and the turn-to-zero counter. Pivoted on the shaft 167 is a frame 175 (Figs. 2 and 5) having a thin plate 176 on the bottom thereof, the frame and bottom-plate forming a guide and a support for a slip of paper in the proper position to receive an impression from the type wheels. This frame 175 is limited in its downward movement by a lug 177 which rests on a shaft 211 journalled in the side frame 32 of the machine. On the left-hand end of the bottom-plate 176 (Fig. 3) is a lug 178 over which an eyelet 181 on the end of the ribbon 179 is hooked. An eyelet 182 in the other end of the ribbon is hooked to a spring pawl 180 carried by the frame 175. This manner of mounting a ribbon affords an easy means for removing the ribbon when it becomes necessary to put a fresh ribbon in the machine.

The frame 175 and the bottom-plate 176 have registering openings for the impression block 165.

Figure 12:
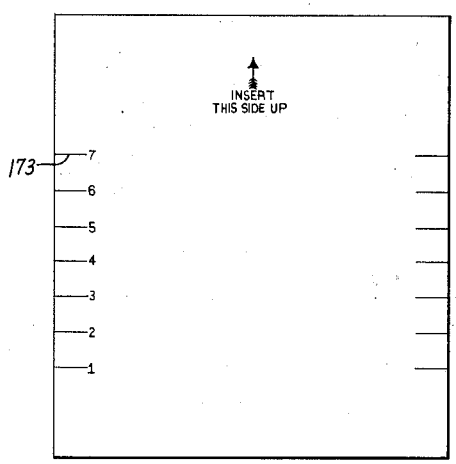
Fig. 12 shows one side of a slip or card which may be inserted in the machine to have the total printed thereon.

All that it is necessary to do to print the total from the totalizer, is to lift the lid 204 of the cabinet, insert a slip, such as that shown in Figs. 12 and 13, into the guide formed by frame 175 and bottom-plate 176, then strike the upper side of the impression frame 164 with the hand, forcing the platen 165 down through the opening in the frame 175 and bottom-plate 176 until it strikes the type wheels 122 and 155 and type plate 158. The slip may have guide lines such as those shown at 173 (Fig. 12) to assist the operator in making his impressions a uniform distance apart. These lines may be registered with the edge 174 (Fig. 2) of the guide frame 175.

The ribbon, of course being between the type wheels and the paper, will cause a legible impression to be made upon the under side of the paper, as shown in Fig. 13.

*Interlocks.*—There is an interlocking device between the impression mechanism, the main operating mechanism, and the total resetting mechanism to compel resetting of the totalizer to zero after the impression means has been operated to print the total, before the machine can be operated to add another item into the totalizer. Pivoted at 190 (Fig. 4) on the frame 54 is a lever 191 carrying a pin 192 which cooperates with the arm 171 of the impression frame 164. The lever 191 also has two notches 193 and 194. Normally cooperating with the notch 193 is a spring drawn pawl 195. The lower arm 196, of the lever 191, cooperates with a bracket 197 fastened to the key coupler 33.

Whenever the impression frame 164 is moved down to take an impression, the arm 171 thereof, by its engagement with the stud 192, rocks the lever 191 counter-clockwise, thus disengaging the notch 193 from the pawl 195 and causing the pawl 195 to engage the notch 194. This simultaneously positions the arm 196 directly above the bracket 197 on the key coupler, and prevents any upward movement of the key coupler and consequently depression of any of the amount keys.

In order to restore the lever 191 to its normal position, the shaft 64 has rigid thereon, a cam 198 (Figs. 3 and 4) which cooperates with a pin 199 on the lever 191. In the normal positions of parts (Fig. 4), there is a clearance between the pin 199 and the low part of the cam 198, and when the lever 191 is moved counter-clockwise, upon depression of the impression frame 164, the pin 199 assumes a position adjacent the low part of this cam 198. Now, when the key 90 turns shaft 64 counter-clockwise (Fig. 4), as the totalizer is reset to zero, the high point of the cam 198, as it reaches the pin 199, rocks the lever 191 clockwise to its normal position, whereby the pawl 195 is disengaged from the notch 194 and engaged with the notch 193, thus maintaining the lever 191 in its normal position. This, of course, moves the arm 196 away from the top of the bracket 197, so that the keys 30 may be operated to enter an item in the totalizer.

*Cabinet lid and cooperating mechanism.*— The totalizer, the counter and the impression device are normally concealed beneath a cabinet lid or closure 204 (Figs. 2 and 7), which lid must be raised in order that an impression may be taken from the type wheels.

Underneath the cabinet lid 204 is an inner cabinet totalizer guard 202 having a sight opening 203 so that the total can be read from the wheels 55 and 56. The opening also discloses the reset counter recording wheels 122 so that the numbers thereon may be read.

There is an interlocking device which cooperates with the totalizer in such a manner that it is impossible to reset the totalizer while the lid is open, and furthermore, it is impossible to operate the main operating shaft 41 and key coupler 33 while the lid is open.

This mechanism includes a pitman 205 (Fig. 7) pivoted to a bracket 206 on the cabinet closure 204. The pitman straddles a stud 207 mounted in the left-hand side frame 32. Upon this stud 207 is mounted a locking lever 208, the upper end of which is bifurcated and surrounds a pin 209 on an arm 210 fastened on a shaft 211 supported by the side frames 32. Also secured to this shaft are four locking hooks 212 (Figs. 1, 7 and 9) each of which cooperates with one of the reverse ratchets 63, previously described as being rigid with the pinions 62 and gears 59, that operate the totalizer wheels. The locking lever 208 carries a pin 213 normally held against the lower end of the pitman 205 by a spring 214. When the cabinet lid 204 is raised, the pitman 205 is drawn upwardly and the pin 213 passes beneath the pitman 205 and a nose 215 of the locking lever, under the influence of a spring 214 attached to the lever and a pin on the side frame enters a large notch 216 in a ratchet 217 fast on the rotation shaft 41 and locks said shaft until the cabinet lid is again closed.

Thus it will be seen that, when the parts are in these positions, it is impossible to turn the rotation shaft 41, and consequently impossible to raise the key coupler 33 or depress one of the amount keys 30. Moreover, when the locking lever 208 is moved clockwise by the spring 214, it, through the pin 209 and arm 210, rocks the shaft 211 counter-clockwise (Fig. 7; clockwise in Fig. 9) and engages the locking hooks 212 with the reverse ratchets 63, thereby positively locking the totalizer and preventing it from being turned to zero by the turn-to-zero key while the cabinet lid 204 is open.

However, as soon as the lid 204 is closed, the pitman 205 is moved downwardly and cams the locking lever 208 in counter-clockwise direction by its engagement with the pin 213, thus disengaging the nose 215 from the ratchet 217 and disengaging the locking hooks 212 from the reverse ratchets 63, and the machine is now in a position whereby the totalizer may be reset.

The ratchet 217 has the added function of locking the machine, if the operator should, during operation thereof, lift the cabinet lid 204. In this case the nose 215 engages one of the smaller teeth of the ratchet, depending upon the position of the rotation shaft, and stops the machine from further operation, thus compelling the operator to again close the lid before he can complete the operation of the machine.

Figure 7:
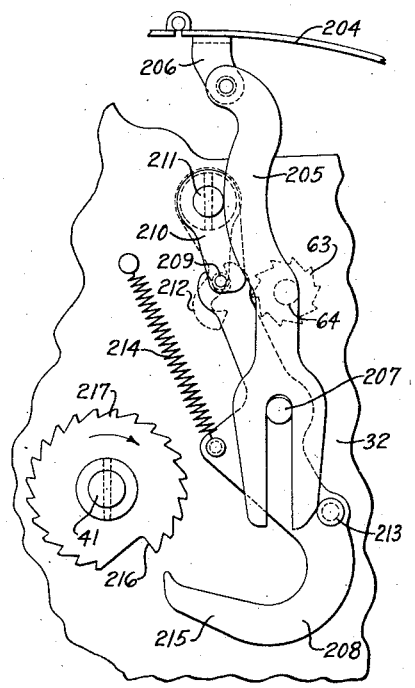
Fig. 7 shows the interlock between the main operating mechanism and the machine cabinet lid or closure, and the interlock between the lid and the totalizer.

*Operation.*—A brief résumé of the operation of the machine is as follows: Assuming that the operator wishes to add 5¢, he depresses the "5" key 30 which raises the key coupler 33 and, through the double rack 38, turns the rotation shaft 41 clockwise (Fig. 6), or counter-clockwise (Fig. 7). This, through the lever 78 (Fig. 2), rocks the totalizer frame 52, for engaging the pinions 62 with the adding racks 141. Depression of the key causes the shoulder 138 of the actuator controller 137 (Fig. 2) to engage the rod 139 of the actuating frame 140 and move the adding rack 141 counter-clockwise a distance equal to five steps on the totalizer wheel. This turns the pinion 62 which, through its connecting gear 59, turns the gear 58, and consequently the totalizer wheel 55, five steps, so that "5" will show on the totalizer wheel. This of course simultaneously sets the item printer wheel 147 (Fig. 1) so that "5" will be in a position to be printed; and also sets the total type wheel 155, associated with the units wheel 55, so that "5" will be in a position to be printed.

The "5" indicator tablet 146 is also raised and exposed to view, and remains in that position until a subsequent operation of the machine.

Assuming that several items have been entered in the machine and the proprietor wishes to know the amount of his sales, he lifts the cabinet lid 204 and places a sheet or card, such as that shown in Figs. 12 and 13, in the machine, locates the card by lining up one of the marks 173 with the edge 174 of the guide frame 175, then depresses the impression frame 164, whereby an impression, such as that illustrated in one of the lines of printing shown in Fig. 13, is made upon the under side of the inserted slip. The top row of figures shows that $141.50 had been entered into the machine, that the number of this particular machine is "541", and that it had, prior to the time of taking this impression, been reset to zero eight times.

After having taken the impression, before another item can be entered in the machine, the cabinet lid 204 must be closed and the key 90 inserted in the machine and turned to rotate the totalizer wheels 55 and 56 to their zero positions. In turning the totalizer to zero, the turn-to-zero or reset counter wheels 122, by the mechanism previously described, is advanced one step. If now the machine has been operated several times, say to the extent of $137.62, and the proprietor prints the total again, the impression which he will get is that shown in the center line of printing in Fig. 13, wherein it shows an amount of "$0137.62," machine No. "541," and the turn-to-zero or reset counter shows "009."

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow:

What is claimed is:

1. In a machine of the class described, the combination of a totalizer, an actuator therefor, a main operating mechanism, a closure normally concealing the totalizer, a normally ineffective locking member to cooperate with the main operating mechanism, means intermediate the closure and said member to hold said member in its ineffective position when the closure is shut, means for moving said member to its effective position when the closure is opened, a normally ineffective locking device for cooperating with the totalizer, and means intermediate said device and said member for moving said device from ineffective position to effective position and vice versa simultaneous with the movement of said member to its effective and ineffective positions, respectively.

2. In a machine of the class described, the combination of a totalizer, an actuator therefor, a main operating mechanism, a turn-to-zero mechanism for the totalizer, an impression device associated with the totalizer, a closure to normally prevent access to the impression device and the totalizer, normally ineffective locking means intermediate the impression device and the main operating mechanism, to prevent movement of the main operating mechanism when said locking means is rendered effective, means operated by the impression device for moving said means to its effective position, means operated by the turn-to-zero mechanism for cooperating with said intermediate locking means to move it to its ineffective position to unlock the main operating mechanism, a device controlled by the movement of the closure in one direction to lock the means which shifts the locking means to its ineffective position, and connections intermediate the closure and said device and operated by movement of the closure in another direction to operate said device to unlock the means which shifts the locking means to its ineffective position.

3. In a machine of the class described, the combination of a totalizer, a closure to prevent access to the totalizer, a turn-to-zero mechanism for the totalizer, a link on said closure adapted to be shifted thereby, a pivoted member controlled by the link, and an arresting means positioned by the pivoted member to prevent a complete operation of the turn-to-zero mechanism when the closure is opened.

4. In a machine of the class described, the combination of a totalizer, a closure to prevent access to the totalizer, a turn-to-zero mechanism for the totalizer, a link on said closure adapted to be shifted thereby, a pivoted member controlled by the link, a spring to shift the pivoted member as the closure is opened, an arresting means operated by the member when shifted by the spring, to prevent a complete operation of the turn-to-zero mechanism, and a cam on said link to restore the arresting means to ineffective position as the closure is shut.

5. In a machine of the class described, the combination of a totalizer; an actuator therefor; driving means intermediate the totalizer and actuator, including gears and ratchets; a closure to prevent access to the totalizer; a turn-to-zero mechanism for the totalizer; means hanging from the closure to be shifted thereby; a pivoted member controlled by the means hanging from the closure; and an arresting means controlled by the pivoted means, and adapted to engage the ratchets of the driving means to prevent the totalizer from being turned to zero by the turn-to-zero mechanism when the closure is opened.

6. In a machine of the class described, the combination with a totalizer adapted to have recording impressions made therefrom; and an actuator for said totalizer; of resetting means for the totalizer; a main operating mechanism; a rockable impression device, including a frame mounted on a stationary pivot; a platen mounted in the frame; said frame adapted to be struck by the operator to contact the platen with the totalizer to take an impression therefrom; a projecting member on the rockable impression device frame; and means operated by said member when the impression device frame is struck to take an impression, to compel an operation of the resetting means for the totalizer before the main operating mechanism can be operated.

In testimony whereof I affix my signature.

EDWARD J. VON PEIN.